J. F. McELROY.
ELECTRICAL RESISTANCE.
APPLICATION FILED MAY 18, 1910.
982,735.
Patented Jan. 24, 1911.
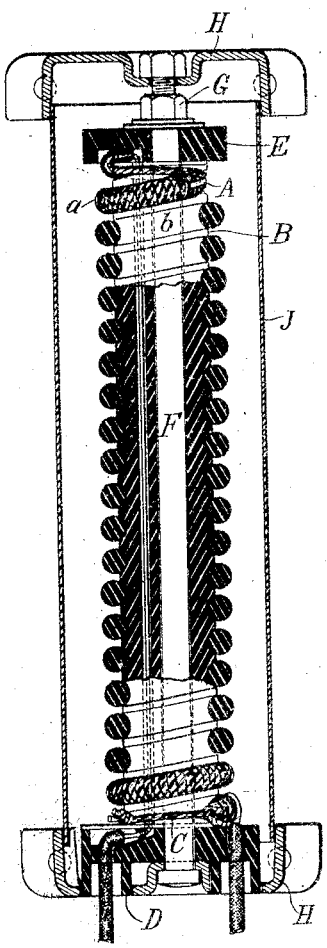
WITNESSES:
L. T. Shaw
H. E. Dehncke
INVENTOR
James F. McElroy
BY E. M. Bentley
ATTY

UNITED STATES PATENT OFFICE.

JAMES F. McELROY, OF ALBANY, NEW YORK, ASSIGNOR TO CONSOLIDATED CAR HEATING COMPANY, A CORPORATION OF WEST VIRGINIA.

ELECTRICAL RESISTANCE.

982,735.

Specification of Letters Patent.   Patented Jan. 24, 1911.

Application filed May 18, 1910.   Serial No. 562,008.

*To all whom it may concern:*

Be it known that I, JAMES F. McELROY, a citizen of the United States, residing at Albany, county of Albany, and State of New York, have invented certain new and useful Improvements in Electrical Resistances, the following being a full, clear, and exact disclosure of the one form of my invention which I at present deem preferable.

For a detailed description of the present form of my invention, reference may be had to the following specification and to the accompanying drawing forming a part thereof, the said drawing being a longitudinal sectional view of a resistance embodying the said invention.

My invention relates to electrical resistances and the mode of manufacturing the same and is particularly designed for resistances composed of extremely fine wire which is mechanically weak and difficult to manipulate and which in the completed resistance requires to be exposed sufficiently to dissipate the heat continually produced by the electric current therein and which also requires to be mounted and supported in a manner consistent with its weak and slender character.

In constructing my resistance, I first take a flexible cord of refractory insulating material such as asbestos (for example, ⅜ of an inch in diameter) and use it as a core upon which I wind the bare resistance wire. I have used for this purpose nichrome wire as fine as .006 of an inch in diameter and such wire is wound upon the asbestos cord about 48 turns to the inch. By this means the wire, while still uncoated by insulating material, is given an adequate support by the cord and is substantially in the position which it will occupy with respect to the cord in the completed resistance. This avoids any subsequent manipulation of the slender wire in an unsupported condition. When the proper length of cord has thus been covered with wire, I place it in an oven and expel the moisture therefrom by heat and after the moisture is thus expelled, I dip the cord with the wire thereon, in a suitable liquid insulator which will at the same time coat the wire and impregnate the surface of the absorbent asbestos cord to make it waterproof. I next return the cord, with its surrounding wire, to the oven and bake it until it is dry and hard yet still flexible. I then wind the cord with its surrounding wire on the exterior of a suitable support as a cylindrical core of fire and water proof insulating material like porcelain, a spiral groove somewhat larger than the diameter of the cord being formed thereon for the reception of the cord. Next, the supporting core, together with the wire-wound cord thereon, is coated with liquid insulating compound and baked until it becomes thoroughly and permanently hard.

Referring to the accompanying drawing, A represents the asbestos cord aforesaid on which the fine resistance wire $a$ is wound. The wire-wound cord is shown as mounted on a porcelain core B of cylindrical form on the outer surface of which a spiral groove $b$ has been formed. The ends of the cord are secured by a tie thread $c$ at each end and the terminals of the wire are brought out through two holes in an insulating disk D applied to one end of the core. A similar disk E is applied to the opposite end of the core and both disks secured in place by a rod F extending through the core from end to end and secured by a nut G. Metallic end pieces H are secured in place outside of the insulating disks by the same rod F and, if desired, a tubular metallic casing J is held in place between the two end plates H. H.

I call particular attention to the flexibility of the cord A by reason of which it can be placed in any desired shape on a suitable support such as the porcelain core B after the wire has been wound thereon. At the same time the asbestos affords a dead or yielding support for the slender wire. The surface of the asbestos is also moisture proof so that the wire may not become oxidized by reason of moisture in the absorbent material of the cord. The insulating material after it has been baked will still be of a sufficiently yielding nature to allow for the expansion and contraction of the wire under the extreme range of temperature to which it is subjected in service. The wire is therefore so held by its insulating coating and the surface of the asbestos that it is not subjected to mechanical strain by its expansion and contraction. The wire moreover remains sufficiently exposed to admit of the dissipation of the heat which is constantly being accumulated by the passage of electric current through it. Should a break occur in the wire it can be readily located and repaired without removing the cord and wire from the support. Should it be desirable at any time to change the coil, it can be readily stripped from the cylindrical support and replaced by a new one. Heretofore resistances of this kind have customarily been formed upon rigid forms such as cast iron and covered with vitreous enamel, so that the wire becomes embedded in a non-compressible and non-expansible material and in the event of a break in the wire the whole device, including the casting upon which the wire is laid, must be thrown away. In contrast to such an arrangement the fine wire of my resistance has a comparatively soft and yielding supporting surface upon the asbestos core and a more complete exposure for dissipation of heat, while the wire can be readily repaired or a new wire readily substituted without a loss of the other portions of the apparatus.

I have designed this device for electric heating as well as for rheostatic use.

What I claim as new and desire to secure by Letters Patent is:

1. An electrical resistance comprising a fine wire combined with a flexible, moisture proof cord of refractory insulating material on which said wire is wound with successive turns separated by an air space, and an insulating support on which is mounted the said cord with the wire thereon exposed to the air.

2. An electrical resistance comprising a rigid support combined with a fine wire wound on a comparatively soft cord of insulating material, and the said cord mounted on the rigid support with the fine wire thereon exposed to the air.

3. An electrical resistance comprising a fine wire combined with a flexible cord of waterproof asbestos on which said wire is wound with successive turns separated by an air space, and a vitreous insulating support on which is mounted the said cord with the wire thereon exposed to the air.

4. An electrical resistance comprising a flexible moisture-proof cord of refractory insulating material, a fine wire wound thereon, the wire being coated and the cord being impregnated with an insulating substance, and a support to which the wire-wound cord is applied in an exposed condition.

5. The method of forming an electrical resistance comprising, first, winding a fine wire on a flexible cord of refractory absorbent insulating material and expelling moisture therefrom and, second, coating the wire and impregnating the surface of said cord with a liquid insulator.

6. The method of forming an electrical resistance, comprising winding a fine wire on a flexible cord of absorbent refractory insulating material, expelling the moisture therefrom, coating the wire and impregnating the surface of said cord with a liquid insulator and baking the cord and wire thus treated.

7. The method of forming an electrical resistance comprising winding a fine wire on a flexible cord of absorbent refractory insulating material, coating the wire and impregnating the surface of the said cord with a liquid insulator, baking the cord and wire thus treated and mounting them on the exterior of an insulating support.

8. The method of forming an electrical resistance comprising winding a fine wire on a flexible cord of refractory material, coating the wire and waterproofing the said cord, mounting the wire-wound cord on its support, applying a liquid insulator to both the cord and its support and finally baking the same.

In witness whereof I have hereunto set my hand, before two subscribing witnesses, this 16th day of May, 1910.

JAMES F. McELROY.

Witnesses:
ERNEST D. JANSEN,
ROBERT McCOCHRANE.